(12) United States Patent
Wang et al.

(10) Patent No.: US 7,301,776 B1
(45) Date of Patent: Nov. 27, 2007

(54) LIGHT-WEIGHT FLASH HARD DRIVE WITH PLASTIC FRAME

(75) Inventors: Kuang-Yu Wang, Saratoga, CA (US); Jim Ni, San Jose, CA (US); Ren-Kang Chiou, Fremont, CA (US); I-Kang Yu, Palo Alto, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 347 days.

(21) Appl. No.: 10/990,887

(22) Filed: Nov. 16, 2004

(51) Int. Cl.
*H05K 1/14* (2006.01)
(52) U.S. Cl. ............... 361/737; 361/736; 361/732; 361/741; 361/685; 360/97.03; 360/97.01; 360/98.01; 360/137
(58) Field of Classification Search ........... 361/732, 361/736, 737, 730, 741, 685; 360/97.03, 360/97.01, 98.01, 137; 174/50
See application file for complete search history.

(56) References Cited

U.S. PATENT DOCUMENTS

| | | | | |
|---|---|---|---|---|
| 5,330,360 A | * | 7/1994 | Marsh et al. ............ | 439/76.1 |
| 5,476,387 A | * | 12/1995 | Ramey et al. ........... | 439/76.1 |
| 5,488,523 A | * | 1/1996 | Seaver et al. ........... | 360/99.12 |
| 5,563,769 A | * | 10/1996 | MacGregor ............. | 361/737 |
| 6,256,878 B1 | * | 7/2001 | Keane .................... | 29/841 |
| 6,430,000 B1 | | 8/2002 | Rent | |
| 6,890,189 B1 | * | 5/2005 | Wu ........................ | 439/76.1 |
| 7,008,240 B1 | * | 3/2006 | Wang et al. ............. | 439/76.1 |
| 7,019,980 B2 | * | 3/2006 | Gu ......................... | 361/737 |
| 2002/0097556 A1 | * | 7/2002 | Lee ........................ | 361/685 |

* cited by examiner

*Primary Examiner*—Dean A. Reichard
*Assistant Examiner*—Hoa C. Nguyen
(74) *Attorney, Agent, or Firm*—Bever, Hoffman & Harms, LLP; Patrick T. Bever

(57) ABSTRACT

A light-weight flash hard drive includes a printed circuit board assembly (PCBA) mounted in a housing formed by a plastic frame and a pair of metal panels that are mounted on the plastic frame over the PCBA. The PCBA includes a PC board and a plug connector that is mounted on a front edge of the PCB. The plastic frame includes first and second parallel side rails and a back end rail extending between back ends of the first and second side rails. The frame defines an open front end and a longitudinal platform for receiving and supporting the PCBA such that the plug connector is exposed through the open front end. The metal panels are either snap-coupled to the plastic frame or to each other. Alternatively, or in addition, an adhesive or insulating film is provided between the metal panels and the IC devices mounted on the PCBA.

14 Claims, 9 Drawing Sheets

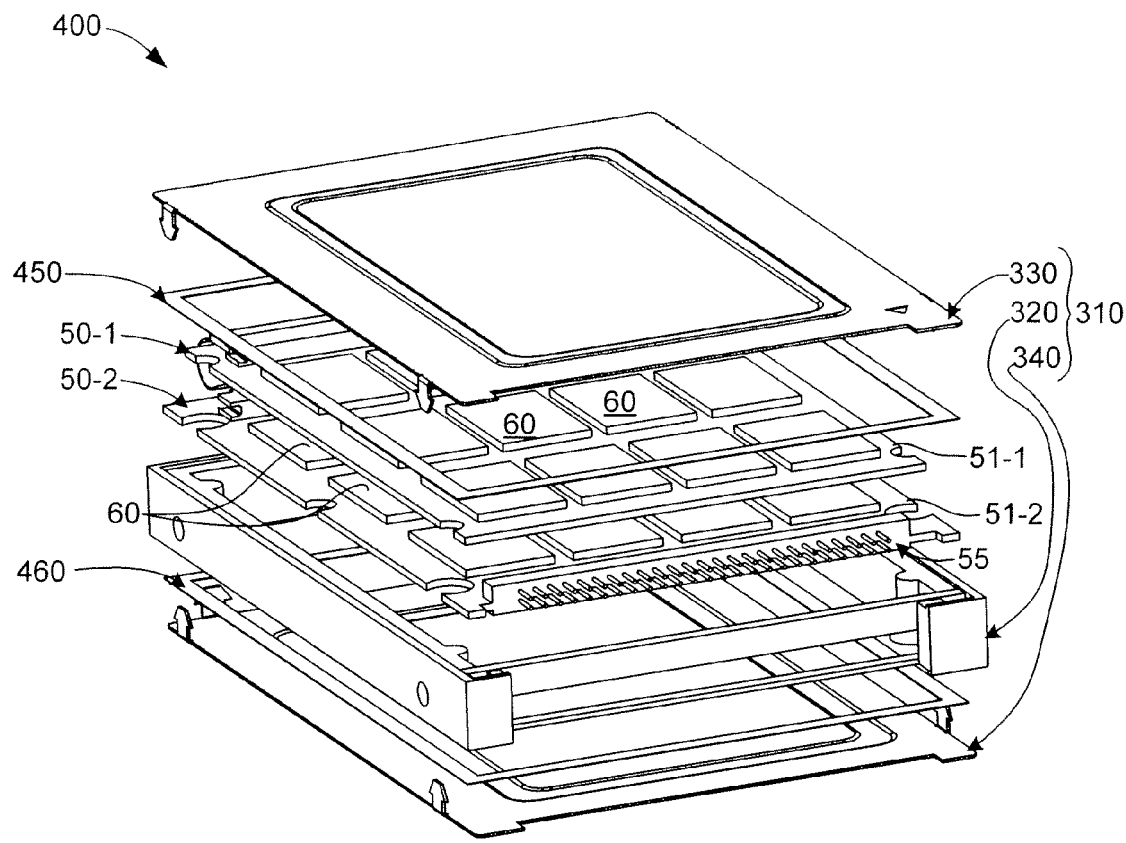
FIG. 20
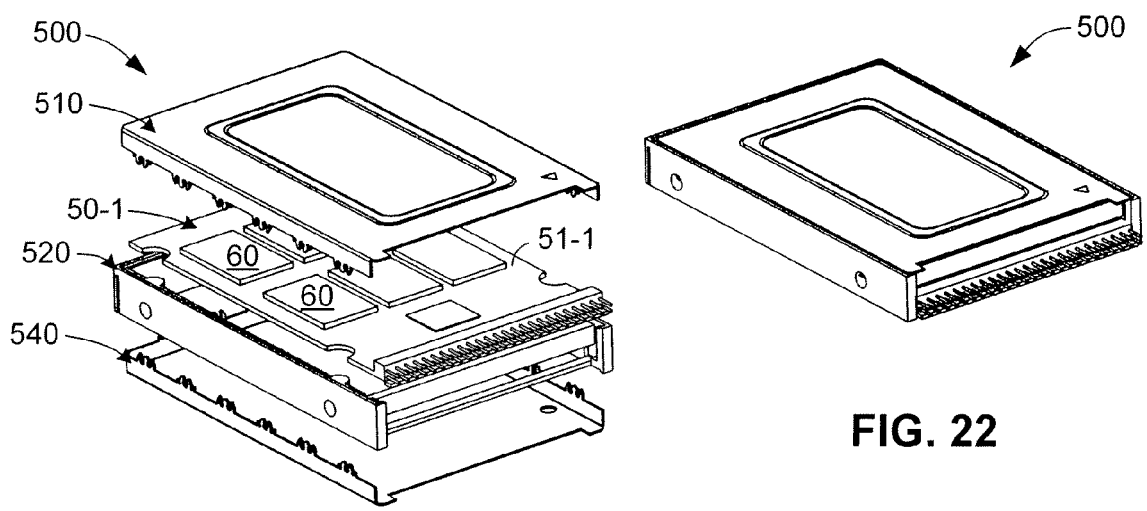
FIG. 21
FIG. 22

US 7,301,776 B1

LIGHT-WEIGHT FLASH HARD DRIVE WITH PLASTIC FRAME

FIELD OF THE INVENTION

The present invention generally pertains to flash hard drive-like devices, and more particularly to housing structures for flash hard drives, and to methods for assembling flash hard drives using such housing structures.

BACKGROUND OF THE INVENTION

Integrated Drive Electronics (IDE) hard-disk drive (HDD) devices have been used for mass data storage in computer systems for many years. While the use of IDE HDD devices is still a method of choice in stationary "desk top" computer systems (e.g., "desktop" personal computers (PCs)), IDE HDD devices have been found less desirable in portable computer systems (e.g., laptop computers), which require combination of high durability, high reliability, and low weight. Accordingly, in such portable systems, flash hard drives have been used in place of IDE HDD devices due to their advantage of exhibiting better survivability in rugged environments, higher durability, higher reliability, higher performance, lower power consumption, and lower weight than IDE HDD devices.

Flash hard drives are solid-state IC devices without any moving parts because, unlike IDE HDD devices which access data stored on a spinning disk, all data is stored on flash memory integrated circuit (IC) devices that are accessed electronically by one or more "controller" IC devices. The flash memory and controller IC devices are typically mounted on the printed circuit board (PCB) of a printed circuit board assembly (PCBA), which typically includes a standardized plug connector for connecting the flash hard drive to a host system. Flash hard drives currently range in size from 4 Mega-byte to 8 Gig-byte, but it is anticipated that their size will increase in the future. Flash hard drives are currently available in TSOP, WSOP, TBGA, and FBGA packages. Flash hard drives currently run on 3.3V, 2.5V or 1.8V supply voltages, depending on the device selected. Flash hard drives typically have operating currents 1 mA,max for stand-by operations and 30 mA,max for operating current. Each flash memory IC "block" (i.e., IC device) of the flash hard drive can typically endure 100K or more Program/Erase cycles. The operating life of flash hard drives can be further extended using technologies such as Wear-Leveling.

Flash hard drives are produced to be a pluggable replacement for existing IDE HDD devices in certain applications (e.g., laptop computers). Thus, flash hard drives are typically produced according to the common form factors for current IDE HDD devices (e.g., 3.5", 2.5", and 1.8"), and data transmissions to and from flash hard drives of each form factor size is consistent with its counterpart IDE HDD devices. For example, both 3.5" flash hard drive and 3.5" IDE HDD devices use a standard 40-pin 0.100" IDE connector and a separate 4-pin power connector. In contrast, 2.5" and 1.8" flash hard drives and IDE HDD devices use a 44-pin 2 mm IDE connector, with pins 41-43 of the connector being used for power connection. For use in host system with 3.5" HDD environment, the 2.5" and 1.8 flash hard drives and IDE HDD devices need an adapter to change the standard 40-pin 0.100" IDE connector and power connector to 44-pin 2 mm IDE connector.

Flash hard drive production typically involves forming a printed circuit board assembly (PCBA), and then housing the PCBA inside of a metal case. The PCBA is produced by mounting selected IC components (i.e., one or more flash memory IC devices and one or more controller IC devices) as well as a suitable connector onto a PCB. The PCBA is then typically mounted into a metal case formed by a pair of metal covers that mount over the PCBA such that the connector is exposed at one end. Unlike production of the PCBA, which is typically produced using well-known automated assembly systems, the process of mounting the flash hard drive housing over the PCBA is typically performed manually. This manual process typically involves placing the PCBA onto one of the two metal covers, and then connecting the second metal cover to the first metal cover using screw or other fasteners such that the PCBA is housed inside.

A problem associated with conventional flash hard drives is that the existing metal cases and metal screws are still too heavy for many light-weight computing systems. However, simply removing the metal casing is not an option because this would expose the delicate electronics (i.e., the flash memory IC devices) to shock and/or corrosion damage. In addition, the conventional manual assembly process can be tedious and time consuming, which can lead to production delays and associated increased production costs.

What is needed is an assembly structure for housing a flash hard drive that addresses the above problems associated with conventional flash hard drives. In particular, what is needed is a light-weight flash hard drive for portable applications that is highly durable and easy to assemble.

SUMMARY OF THE INVENTION

The present invention is directed to method for assembling a flash hard drive that addresses the problems associated with conventional flash hard drives by providing a light-weight plastic frame for housing a printed circuit board assembly (PCBA), and two thin metal panels that are secured to the edges of the plastic frame over the PCBA. The plastic frame includes side and back end rails that define a longitudinal platform for supporting the PCBA such that its plug connector is exposed through an open end of the frame. The metal panels are then fitted into grooves or steps formed along the rails of the plastic frame such that outer surfaces of the metal panels are flush with the upper and lower edges of the plastic frame rails. According to an embodiment of the invention, the metal panels are secured to the plastic frame by way of connecting structures formed along outer edges of the panels, and/or is attached directly to the plastic frame or to the integrated circuit (IC) devices of the PCBA by way of an electric isolation (insulating) or adhesive contact layer. By forming flash hard drives using a plastic frame and thin metal panels that are reliably secured over the PCBA, a flash hard drive formed in accordance with the present invention is both light-weight and durable, thereby providing a highly desirable storage device for portable computing systems, such as laptop computers. In particular, the light-weight flash hard drive eliminates the heavy metal casing and screws required by conventional flash hard drive structures while providing effective protection for the enclosed electronic components and a firm and secure platform for the plug connector (so that the plug connector will not become loose and separated from the housing after extended usage), and also simplifies assembly work.

According to another embodiment of the present invention, each metal panel includes connection fingers that are snap-coupled either directly to the plastic frame, or to corresponding connection structures provided in the opposing panel. In one specific embodiment, identical metal panels include male-type connection structures that are snap-coupled into engagement holes formed in the plastic frame. In an alternative embodiment, each connection finger forms one part of a self-engaging member such that the connection structure of one of the metal panels engages with a corresponding connection structure formed on the opposing metal panel, thereby securing the two panels to the plastic frame.

According to another embodiment, an adhesive or insulating contact layer is provided between inside surfaces of the metal panels and upper surfaces of the IC devices mounted on the PCBA. In one embodiment, the contact layer comprises a thermal transfer or shock absorbing material, thereby facilitating thinner metal panels and a shorter overall profile. In addition, or in the alternative, the metal panels are secured to the PCBA (e.g., to the upper surfaces of the integrated circuit (IC) devices of the PCBA) or to other structures of the PCBA by way of an adhesive layer.

According to an embodiment of the present invention, the side rails of the plastic frame define a longitudinal shelf (platform) that supports the outer edges of the PCBA when it is inserted therein, and the end rail also defines an end portion of the longitudinal shelf that receives and supports a back end edge of the PCB. In accordance with an alternative embodiment, the longitudinal platform provided in the plastic frame is a longitudinal slot that slidably receives the PCBA, thereby minimizing handling of and damage to the PCBA during the assembly process, and thus reducing overall manufacturing costs. In addition, the longitudinal slot provides a reliable structure for securing the PCBA inside the flash hard drive, thereby resisting damage caused, for example, when the flash hard drive is dropped or otherwise subjected to mechanical shock.

According to another embodiment of the present invention, a method for producing a flash hard drive includes producing the various components, sliding or otherwise mounting the PCBA into the plastic frame, and then securing the top and bottom panels to cover and protect the PCBA. In one embodiment. In addition, a heat-activated or heat-cured adhesive is provided between inner surfaces of the metal panels and the upper surfaces of the IC devices, and the assembly is mounted in a fixture that presses the metal panels against the plastic frame and PCBA. The fixture is then inserted into an oven to activate/cure the adhesive.

According to various other aspects of the invention, the housing is based on either of a 2.5" and 1.8" form factor, and/or allows Thin Small Outline Package (TSOP) or Very Very Small Outline Package (WSOP), or Ball Grid Array (BGA), or die with die bonding to PCB, etc. to be used. The aforementioned hard-disk drive interface is Integrated Drive Electronics (IDE) and according to various other aspects of the invention can be applied to Serial Advanced Technology Attachment (SATA), Small Computer Systems Interface (SCSI), etc.

BRIEF DESCRIPTION OF THE DRAWINGS

These and other features, aspects and advantages of the present invention will become better understood with regard to the following description, appended claims, and accompanying drawings, where:

FIG. 20 is an exploded perspective view showing a flash hard drive frame according to another embodiment of the present invention;

FIG. 21 is an exploded perspective view showing a flash hard drive frame according to another embodiment of the present invention; and FIG. 22 is an assembled perspective view showing the flash hard drive of FIG. 21.

DETAILED DESCRIPTION OF THE DRAWINGS

Figure 1:
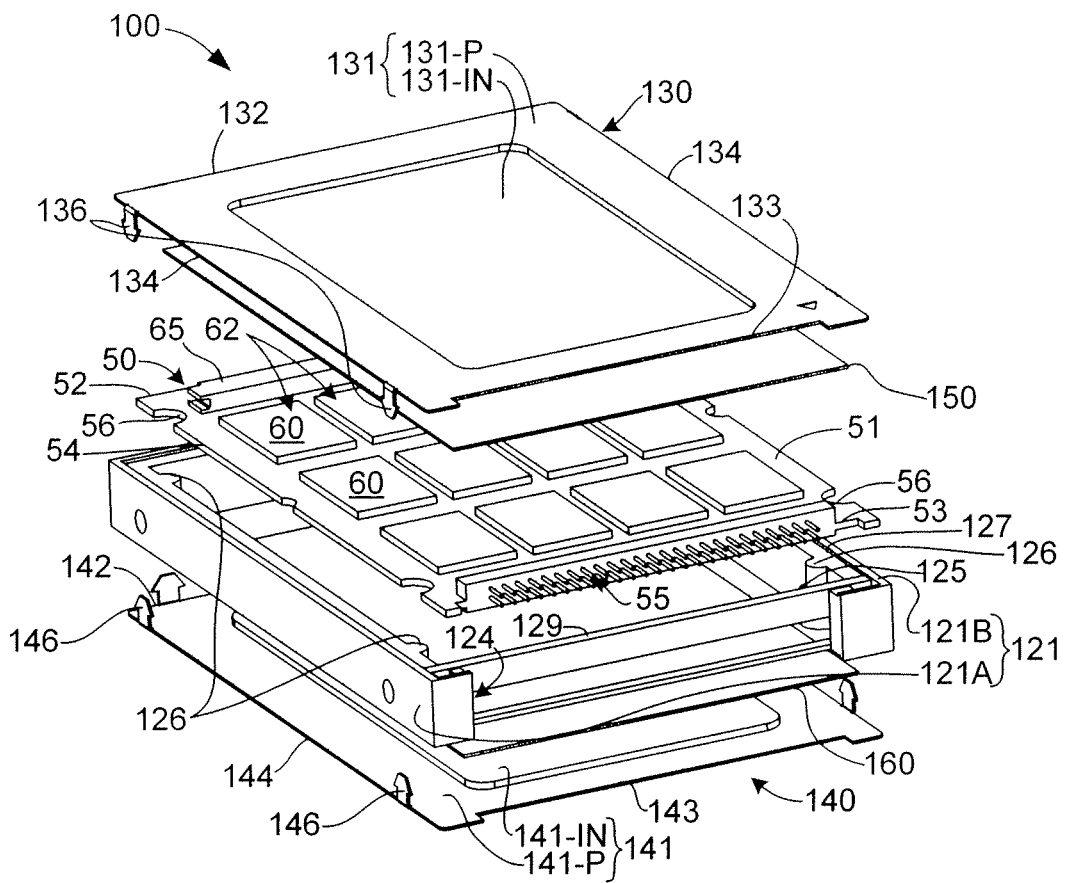
FIG. 1 is an exploded perspective view showing a flash hard drive according to an embodiment of the present invention.
Figure 2:
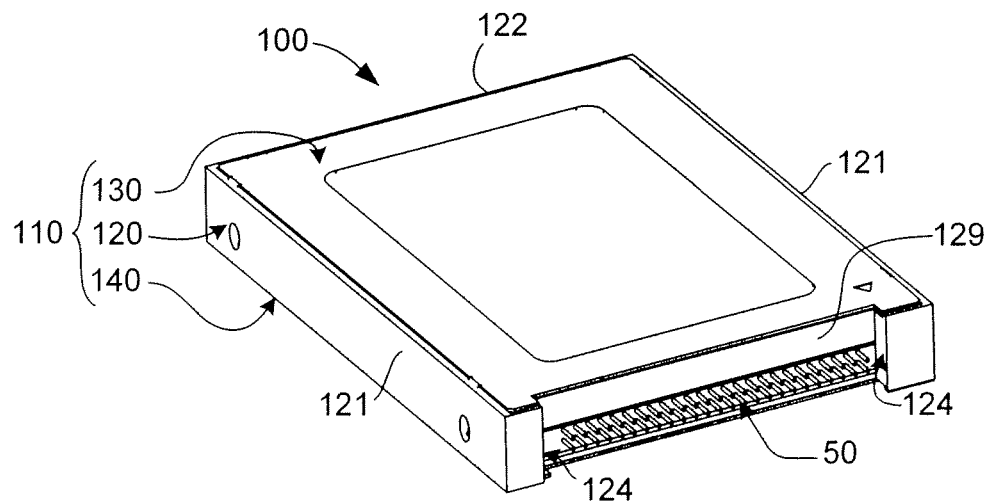
FIG. 2 is a perspective view showing the fully assembled flash hard drive produced using the components of FIG. 1.

FIGS. 1 and 2 are exploded perspective and assembled perspective views, respectively, showing a flash hard drive 100 according to an embodiment of the present invention. Flash hard drive 100 generally includes a PCBA 50 mounted inside of a housing 110 that is generally formed by a plastic frame 120, a top panel 130 and a bottom panel 140. Additional features and structures of flash hard drive 100 are described below.

PCBA 50 generally includes a PCB 51 and a connector 55. PCB 51 is sized and constructed according to a predefined form factor, and includes one or more IC devices 60 (e.g., flash memory IC devices and one or more controller IC devices) and other optional electronic components mounted thereon. Each IC 60 has a substantially planar upper surface 62 that is spaced from and parallel to the surfaces of PCB 51. Connector 55, which also conforms to the selected form factor, is mounted onto a front edge 53 of PCB 51, and includes pins that communicate with ICs 60 via corresponding traces (not shown) formed on PCB 51 according to well-known practices. PCB 51 also includes a back edge 52 that is inserted into frame 120 in the manner described below. Several optional alignment notches 56 are defined along one or more edges of PCB 51.

Plastic frame 120, top panel 130 and bottom panel 140 collectively form housing 110, which is cooperatively assembled with PCBA 50 to protect ICs 60 and other components mounted on PCB 51. Plastic frame 120 supports PCB 51 in the manner described below. Top panel 130 and bottom panel 140 are stamped or otherwise formed from a suitably rigid material (e.g., sheet metal), and are respectively secured to the upper and lower edges of frame 120. Top panel 130 includes a substantially flat (planar) cover plate 131 having a back edge 132 and a front edge 133. The side edges 134 of wall 131 may be bent downward (i.e., substantially perpendicular to the plane defined by cover plate 131), and back edge 132 may also be bent downward to form an end wall (not shown). Extending downward from side edges 134 and end edge 132 are connection fingers 136 that secure top panel 130 to plastic frame 120 in the manner described below. Cover plate 131 includes a planar peripheral region 131-P surrounding a planar indented section 131-IN. In one embodiment, planar indented section 131-IN has a size that is substantially equal to a "footprint" collectively defined by IC devices 60. Similar to top panel 130, bottom panel 140 includes a substantially flat (planar) cover plate 141 having back edge 142 and a front edge 143, with side edges 144 of cover plate 141 including connection fingers 146 extending upward for connection to plastic frame 120. Cover plate 141 includes a planar peripheral region 141-P surrounding a planar indented section 141-IN.

Plastic frame 120 generally includes parallel side rails 121A and 121B (collectively referred to as side rails 121), a "closed" back end rail 122, and an "open" front end 124. End rail 122 extends between and rigidly connects back edges of side rails 121, and forms a closed end of frame 120. Open front end 124 is defined at front ends of side rails 121, and serves to expose connector 55 when PCBA 50 is mounted inside plastic frame 120. Plastic frame 120 provides a longitudinal shelf (platform) 125 for supporting PCB 51 along side edges 54 and back edge 52 in the manner described below. Several alignment protrusions 126 are located along side walls 121 that mate with alignment notches 56 formed in PCB 51 during the assembly process, as described below. Formed on an upper surface of side rails 121 and end rail 122 is an elongated groove or step 127 for receiving side edges 134 and back edge 132 of top panel 130 in the manner described in additional detail below. A similar elongated groove/step (not shown) is formed on a lower surface of side rails 121 and end rail 122 for receiving side edges 144 and back edge 142 of bottom panel 140. One or more holes (shown in FIG. 3, discussed below) are formed in groove 127 for receiving connection fingers 136 and 146 in the manner described below. An optional face plate 129 extends between side rails 121 adjacent to open end 124, and is positioned above the plane defined by longitudinal shelf 125 such that, when PCBA 50 is inserted into plastic frame 120, connector 55 is exposed below face plate 129, as indicated in FIG. 2.

Referring again to FIG. 1, according to an aspect of the invention, an upper isolation (contact) layer 150 and an optional lower isolation (contact) layer 160 are respectively disposed between upper surfaces 62 of IC devices 60 and an inside (underside) surface of upper metal panel 130 and lower metal panel 140. In one embodiment, contact layers 150 and 160 are adhesive layers that serve to secure the inside surfaces of cover plates 130/140 to PCBA 50 (e.g., to upper surfaces 62 of IC devices 60 or to other portions of PCB 51 or to mounting structures, such as a bar 65, that is secured to PCB 51). By both securing the peripheral edges of cover plates 131 and 141 to plastic frame 120 (i.e., using connection fingers 136/146) and securing a central region of cover plates 131 and 141 to PCBA 50, housing 110 provides a highly reliable rigid protection structure that is substantially less expensive to produce than conventional metal-frame housings connected by fasteners. The inventors note that although the integrity of housing 110 is maximized by using both connection fingers 136/146 and electric isolation layers 150/160, one or both of these connecting elements may be omitted is certain specific embodiments. For example, in embodiments where connection fingers 136/146 provide a highly reliable and rigid connection between metal frames 130/140 and plastic frame 120, isolation layers 150/160 may comprise an electrically insulating, shock-absorbing material that allows cover plates 131/141 to press against PCBA 50 but prevents damage to IC devices 60. Note also that isolation 150/160 may be formed using a thermally conductive material, thereby facilitating cooling of IC devices 60 by way of cover plates 130 and 140 (i.e., cover plates 130/140 act as heat sinks in this arrangement).

FIG. 2 shows flash hard drive 100 after PCBA 50 is received in plastic frame 120, and panels 130 and 140 are mounted onto upper and lower surfaces of plastic frame 120. Note that when PCBA 50 is fully inserted into frame 120 and panels 130 and 140 are mounted thereon, connector 55 is exposed through open end 124, and the peripheral edges of panels 130 and 140 (e.g., side edges 134/144 and back edges 132/142) are mated to plastic frame 120 such that planar peripheral regions 131-P and 141-P are substantially flush with the upper and lower edges of side rails 121 and closed back end rail 122. In addition to providing a more aesthetically attractive package, this flush arrangement prevents exposure of side edges 134/144 and back edges 132/142 to damage by snagging or otherwise being pried from plastic frame 120, thus allowing cover plates 130/140 to be formed using a thinner metal plate than that required in conventional hard disk drives, thereby further facilitating lighter weight without sacrificing durability and protection.

Figure 3:
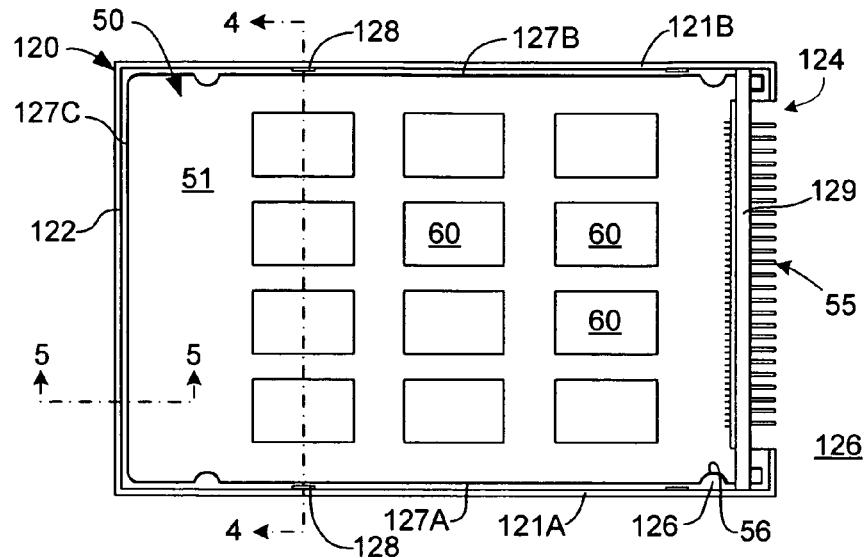
FIG. 3 is a top plan view showing a frame utilized in the flash hard drive shown in FIG. 1.
Figure 4A:
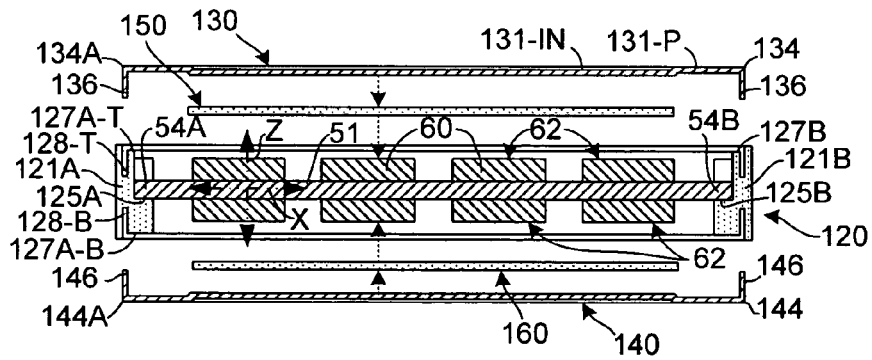
FIGS. 4(A) and 4(B) are partially exploded and fully assembled cross-sectional end views taken along section line 4-4 of FIG. 3.
Figure 5:
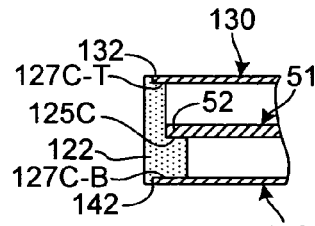
FIG. 5 is a cross-sectional side view taken along section line 5-5 of FIG. 3.
Figure 4B:
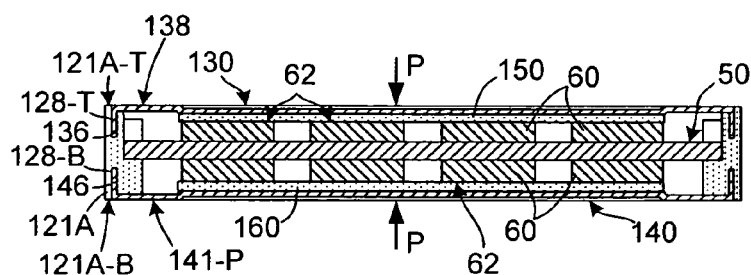

FIG. 3 is a top plan view showing frame 120 and PCBA 50 in additional detail, and FIGS. 4(A) and 4(B) and 5 are cross sectional side views taken along section lines 4-4 and 5-5, respectively, which are shown in FIG. 3.

As discussed above and shown again in FIG. 3, frame 120 includes parallel side rails 121A and 121B that are connected by back end rail 122, and includes a PCB support shelf 125 extending around side rails 121A and 121B and back end rail 122. FIGS. 4(A) and 4(B) show an exemplary cross-section of side rails 121A and 121B, and depicts top panel 130 and bottom panel 140 respectively positioned before and after mounting onto plastic frame 120. Similarly, FIG. 5 shows an exemplary cross-section of end rail 122 with top panel 130 and bottom panel 140 mounted thereon.

As indicated in FIGS. 4(A), 4(B) and 5, support shelf 125 is defined by side rails 121A and 121B and end rail 122, and is located in an X-Y plane extending across a central region of plastic frame 120 between side rails 121A and 121B. In particular, as indicated on the left side of FIG. 4(A), side rail 121A defines a shelf portion 125A that receives side edge 54A of PCB 51 when PCBA 50 is inserted into plastic frame 120. Referring to the right side of FIG. 4(A), side rail 121B defines a shelf portion 125B that supports a second side edge 54B of PCB 51 when PCBA 50 is inserted into plastic frame 120. Similarly, FIG. 5 shows that end rail 122 defines an end shelf portion 125C that supports back edge 52 of the PCB 51. By providing precisely cut shelf portions 125A, 125B, and 125C, PCB 51 is securely supported within plastic frame 120 during assembly to minimize the possibility of damage or circuit short due to contact with top panel 130 or bottom panel 140.

In addition, FIG. 4(A) shows upper groove portion 127A-T and bottom groove portion 127A-B for receiving side edge 134A of top panel 130 and side edge 144A of bottom panel 140. Defined into groove portions 127A-T and 127A-B are engagement holes 128-T and 128-B, respectively, for receiving connection fingers 136/146, respectively. Engagement holes 128-T and 128-B, can be either through-holes penetrating the side rails 121A or 121B, or pocket-like cavities with rectangular cross-sections and depths that are shorter than the height of the side rails 121A or 121B. For illustration purpose, FIG. 4(A) shows the pocket-like engagement holes 128-T and 128-B. As shown in FIG. 5, a similar groove portions 127C-T and 127C-B are formed along back rail 122 for supporting back edges 132/142 of panels 130/140, respectively.

Figure 6:
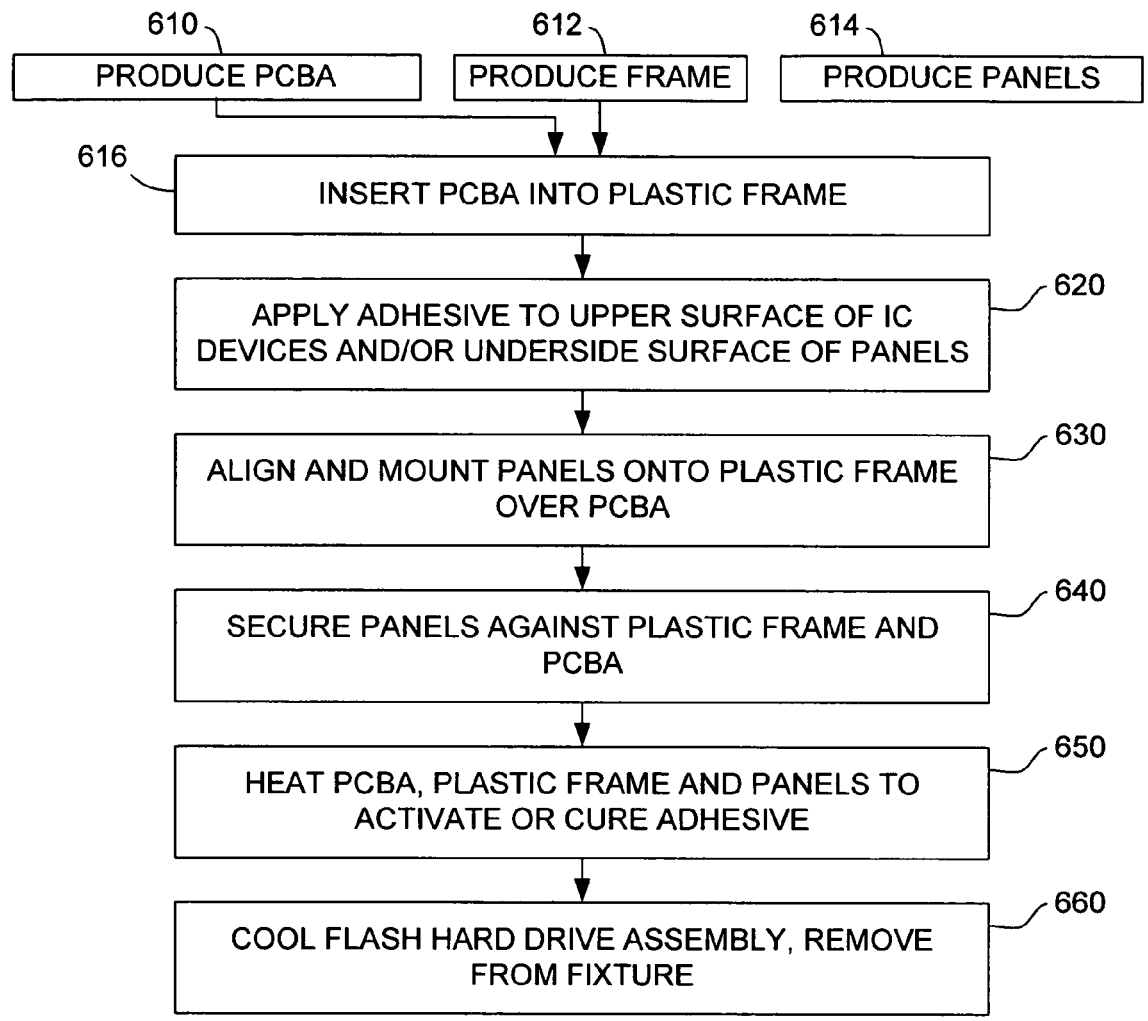
FIG. 6 is a flow diagram showing a method for producing a flash hard drive according to another embodiment of the present invention.

FIG. 6 is a flow diagram showing a simplified method for producing a flash hard drive according to another embodiment of the present invention. Referring to the upper portion of FIG. 6, upon assembling and pre-testing a PCBA (block 610), and producing or otherwise procuring a plastic frame consistent with the frame structures described herein (block 612) and top and bottom panels consistent with the panel structures described herein (block 614), the method includes inserting the PCBA into the plastic frame (block 616) in the manner described above. When fully inserted, back edge 52 of PCB 51 is supported by shelf portion 125C (FIG. 5), and connector 55 is exposed through open end 124 (as indicated in FIG. 2). A suitable self-locking mechanism (e.g., snap-coupling between frame 120 and PCB 51 and/or connector 55) may be used to secure frame 120 to PCBA 50.

Referring to the center of FIG. 6, after PCBA 50 is inserted and secured to plastic frame 120, contact/isolation layers 150/160 are applied either upper surfaces 62 of IC devices 60, or to the inside surfaces of panels 130/140 (block 620). Panels 130/140 are then aligned and mounted onto plastic frame 120 and PCBA 50 in the manner described above (block 630). Contact/isolation layers 150/160 are comprised of be either electric isolation material for applications shown in FIG. 1 or 12, or adhesive material for applications shown in FIG. 13 or 20 (discussed below). Details of the adhesive material will be described below. The thus-assembled structure is then secured in a fixture (block 640) such that the panels are pressed against the IC devices. For example, as shown in FIG. 4(B), panels 130 and 140 are compressed by force P, which is exerted by the fixture (not shown) such that contact/isolation layers 150/160 are sandwiched between panels 130/140, respectively, and external surfaces 62 of IC devices 60. Note that the panels 130/140 are thus maintained such that connection fingers 136/146 are received in respective engagement holes 128-T and 128-B, and such that, e.g., planar peripheral region 131-P is flush with an upper edge 121A-T of side rail 121A, and planar peripheral region 141-P is flush with lower edge 121A-B of side rail 121A. As indicated in FIG. 5, back edges 132/142 are similarly supported such that they are flush with upper and lower edges of back end rail 122. Returning to FIG. 6, the fixture is then inserted into an oven to subject to a heating process to activate/cure an optional adhesive provided by contact/isolation layers 150/160 (block 650). After activating/curing the adhesive, the fixture is removed from the oven and allowed to cool, and then the flash hard drive assembly is removed from the fixture (block 660).

As mentioned above, according to an aspect of the present embodiment, a series of engagement holes 128 (see, e.g., FIG. 3) are formed in frame 120 along the bottom surface of peripheral groove portions 127A, 127B, and 127C, and top panel 130 is provided with connection fingers 136 that are inserted into engagement holes 128-T when top panel 130 is secured onto frame 120. Similar peripheral groove portions and engagement holes 128-B are also formed on the lower surface of frame 120, and bottom panel 140 includes connection fingers 146 that are inserted into these lower engagement holes when bottom panel 140 is secured onto frame 120. These connection fingers and engagement holes facilitate convenient mounting of the panels by acting as guides to align the panel walls with the frame grooves. In addition, as described in accordance with the various embodiments disclosed below, the connection fingers provide structures that automatically snap-couple the panels to the frame (or another structure), and serve to permanently connect the panels to the frame; that is, upon pressing the panels onto the frame, the connection fingers automatically engage either a portion of the frame such that subsequent removal of the panel causes permanent damage to the connection fingers and/or to the frame structure. This permanent damage facilitates easy identification of flash hard drives that have been disassembled, thereby reducing security risks due to tampering with the flash hard drive electronics.

According to an embodiment of the present invention, both top panel 130 and bottom panel 140 include substantially identical (e.g., male-type) connection structures (e.g., connection fingers 136 and 146) that are snap-coupled directly to plastic frame 120 (i.e., not to a corresponding female connector of the opposite panel). By providing substantially identical connection structures, both the top and bottom panel can be produced using the same stamping machine such that top panel 130 and bottom panel 140 are interchangeable), thereby reducing manufacturing costs because only a single tool (e.g., a stamping press) and a single set of tooling (e.g., a die) are required to produce both top panel 130 and bottom panel 140. In contrast, when different connection structures (e.g., male-type on a top panel and female-type on a bottom panel that engage when both panels are mounted onto the frame), two different stamping presses are required, which increases production costs.

Figure 7A:
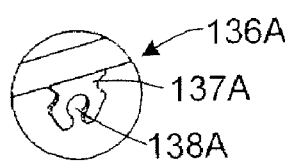
FIGS. 7(A), 7(B), and 7(C) are perspective views showing two-dimensional (2D) connection members utilized by the flash hard drive shown in FIG. 1.
Figure 8A:
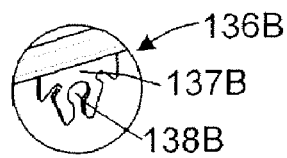
FIGS. 8(A), 8(B), and 8(C) are perspective views showing 2D connection members according to another embodiment of the present invention.
Figure 9A:
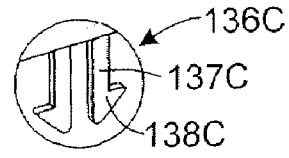
FIGS. 9(A), 9(B), and 9(C) are perspective views showing 2D connection members according to yet another embodiment of the present invention.
Figure 7B:
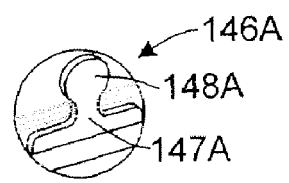
Figure 8B:
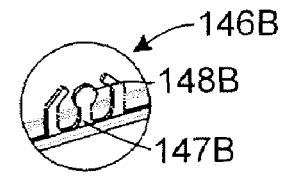
Figure 9B:
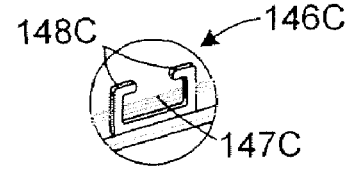
Figure 7C:
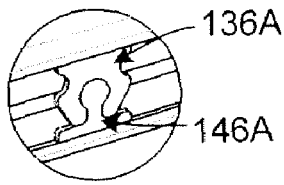
Figure 8C:
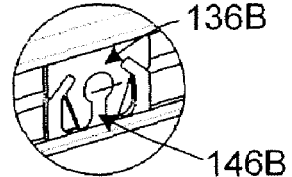
Figure 9C:
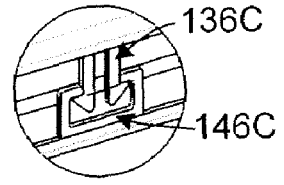

Referring again to FIG. 1, according to an embodiment of the invention, top cover 130 and bottom cover 140 include complementary two-dimensional (2D) self-engaging connection structures 136 and 146 that respectively extend from side walls 114 and 144, which extend perpendicular to cover plate 131. Both structures 136 and 146 will be on the same plane for the engagement to properly take place. Frame 120 is formed substantially as described above but includes through-holes (not shown) that allow connection structures 136 and 146 to pass through and engage each other. Self-engaging structures are optionally provided on closed back end walls 132 and 142 of top metal panel 130 and bottom metal panel 140, respectively. FIGS. 7(A)-(C), 8(A)-(C), and 9(A)-(C) show self-engaging connection structures that can be utilized on top panel 130 and bottom panel 140 according to alternative embodiments of the present invention. FIG. 7(A) shows a first connection structure 136A, which includes an base member 137A defining an engagement region 138A, and FIG. 7(B) shows a complimentary connection structure 146A, which includes a base member 147A having a tab 148A extending therefrom that self-engages with connection structure 136A in the manner indicated in FIG. 7(C) when top panel 130 and bottom panel 140 are mounted onto frame 120 (FIG. 2). FIG. 8(A) shows another first connection structure 136B, which includes an base member 137B defining an engagement region 138B, and FIG. 8(B) shows a complimentary connection structure 146B, which includes a base member 147B having a tab 148B extending therefrom that self-engages with connection structure 136B in the manner indicated in FIG. 8(C). Finally, FIG. 9(A) shows a male-type connection finger 136C, which includes an elongated member 137C and an engagement member 138C that is mounted on an end of elongated member 137C, and FIG. 9(B) shows a 2D female-type connection structure 146C, which includes a 2D frame 148C defining an opening 147C for receiving male-type connection finger 136C in the manner indicated in FIG. 9(C).

Figure 10A:
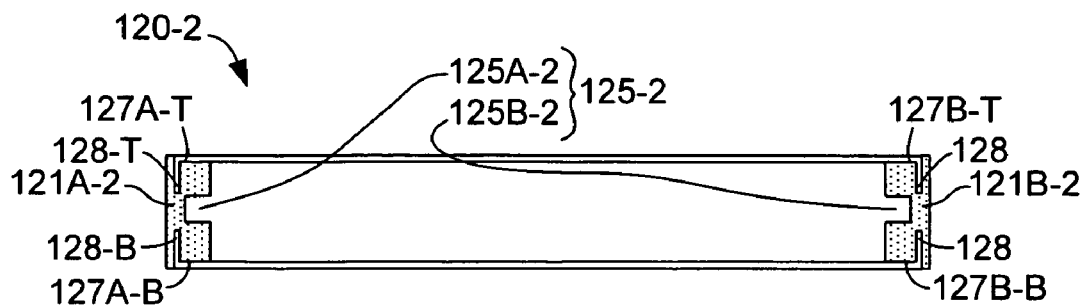
FIGS. 10(A) and 10(B) are cross-sectional side views showing a plastic frame and assembled flash hard drive according to another embodiment of the present invention.
Figure 10B:
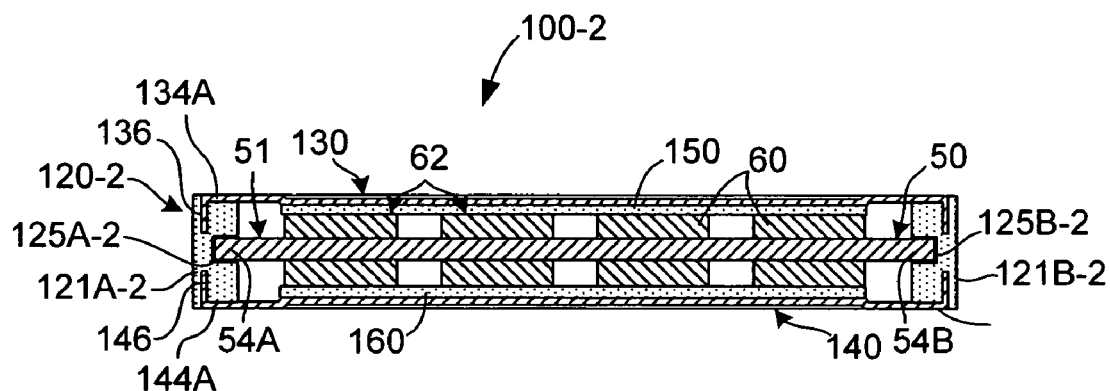
Figure 11:
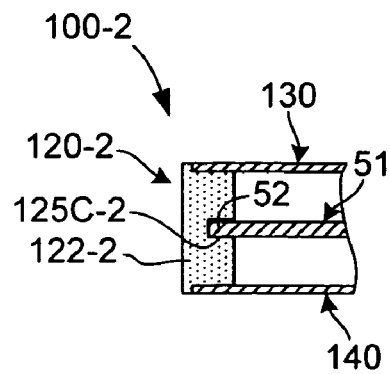
FIG. 11 is cross-sectional side view showing a back end portion of the flash hard drive shown in FIG. 10(B)

FIGS. 10(A), 10(B) and 11 show a second flash hard drive 100-2 according to an alternative embodiment of the present invention. Referring to FIG. 10(A), this embodiment utilizes a plastic frame 120-2 including a longitudinal slot (platform) 125-2 that is defined by side rails 121A-2 and 121B-2 and end rail 122-2, and is located in an X-Y plane extending across a central region of plastic frame 120-2 between side rails 121A and 121B. In particular, as indicated on the left side of FIGS. 10(A) and 10(B), which shows the assembled flash hard drive 100-2, side rail 121A-2 defines a slot portion 125A-2 that receives side edge 54A of PCB 51 when PCBA 50 is inserted into plastic frame 120. Referring to the right side of FIGS. 10(A) and 10(B), side rail 121B-2 defines a slot portion 125B-2 that supports a second side edge 54B of PCB 51 when PCBA 50 is inserted into plastic frame 120. Similarly, FIG. 11 shows that end rail 122-2 defines an end slot portion 125C-2 that supports back edge 52 of the PCB 51. By providing precisely cut slot portions 125A-2, 125B-2, and 125C-2, the assembly process is somewhat simplified (i.e., PCBA 50 may be held by the connector and slidably inserted into slot 125-2), and PCB 51 is securely supported within plastic frame 120 during assembly to minimize the possibility of damage or circuit short due to contact with top panel 130 or bottom panel 140. That is, by securing the side and leading edges of the PCB in this manner, the PCB is securely held in longitudinal slot 125-2 between panels 130 and 140 such that both horizontal and vertical movement of the PCB are restricted, thereby avoiding damage to the PCB when the assembled flash hard drive is subjected to mechanical shock (e.g., by dropping onto a hard surface). In addition, similar to the embodiment described above, plastic frame 120-2 includes upper groove portion 127A-T and bottom groove portion 127A-B (indicated in FIG. 10(A)) for receiving side edge 134A of top panel 130 and side edge 144A of bottom panel 140 (indicated in FIG. 10(B)). In addition, groove portions 127A-T and 127A-B include engagement holes 128-T and 128-B (indicated in FIG. 10(A)) for receiving connection fingers 136/146, respectively (indicated in FIG. 10(A)). As such, after PCBA is slidably inserted into plastic frame 120-2, the assembly process proceeds essentially as described above.

Figure 12:
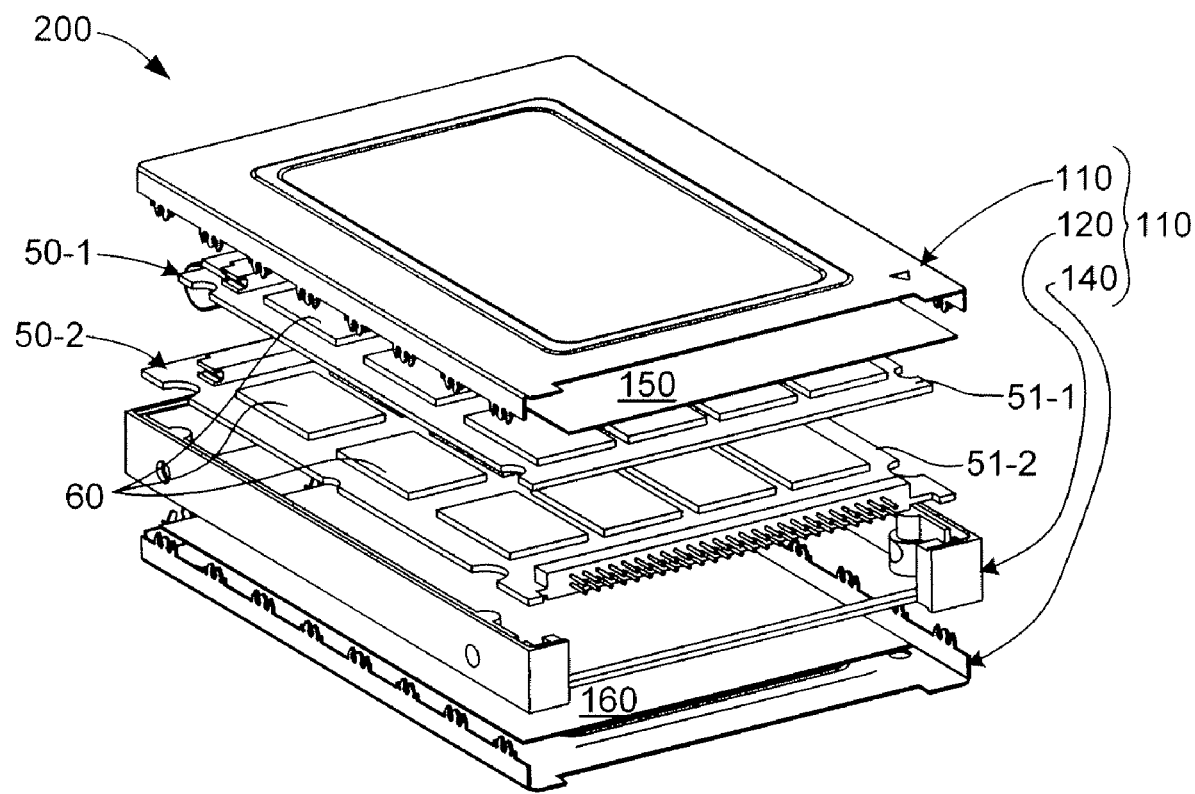
FIG. 12 is an exploded perspective view showing a flash hard drive according to another embodiment of the present invention.

FIG. 12 is an exploded perspective view showing a flash hard drive 200 including a two PCBAs 50-1 and 50-2 mounted inside of a housing 110 that includes a plastic frame 120, an upper metal panel 130, and a lower metal panel 140, which are similar to corresponding structures described above with reference to flash hard drive 100. PCBAs 50-1 and 50-2 respectively include PCBs 51-1 and 51-2 that are mounted in a stacked arrangement inside of housing 110, with lower PCBA 50-2 including connector 55, and upper PCBA 50-1 connected to lower PCBA 50-2 by way of a flexible cable (not shown). An electric isolation layer 150, similar to that described above, is provided to respectively secure the inside surface of metal panel 130 to the upper surfaces of IC devices 60 mounted on upper PCBA 50-1, and electric isolation layer 160 is similarly situated between the inside surface of metal panel 140 and IC devices 60 mounted on lower PCBA 50-2. By using double PCBA's, the storage capacity of the flash hard drive 200 can be increased.

Although the present invention is described above with reference to panel structures having male/female and/or self-locking connection structures connection structures, certain aspects of the present invention may be included in flash hard drives utilizing substantially identical (e.g., male-type) that facilitate convenient and low cost connection of the panels to the frame during the flash hard drive assembly process.

Figure 13:
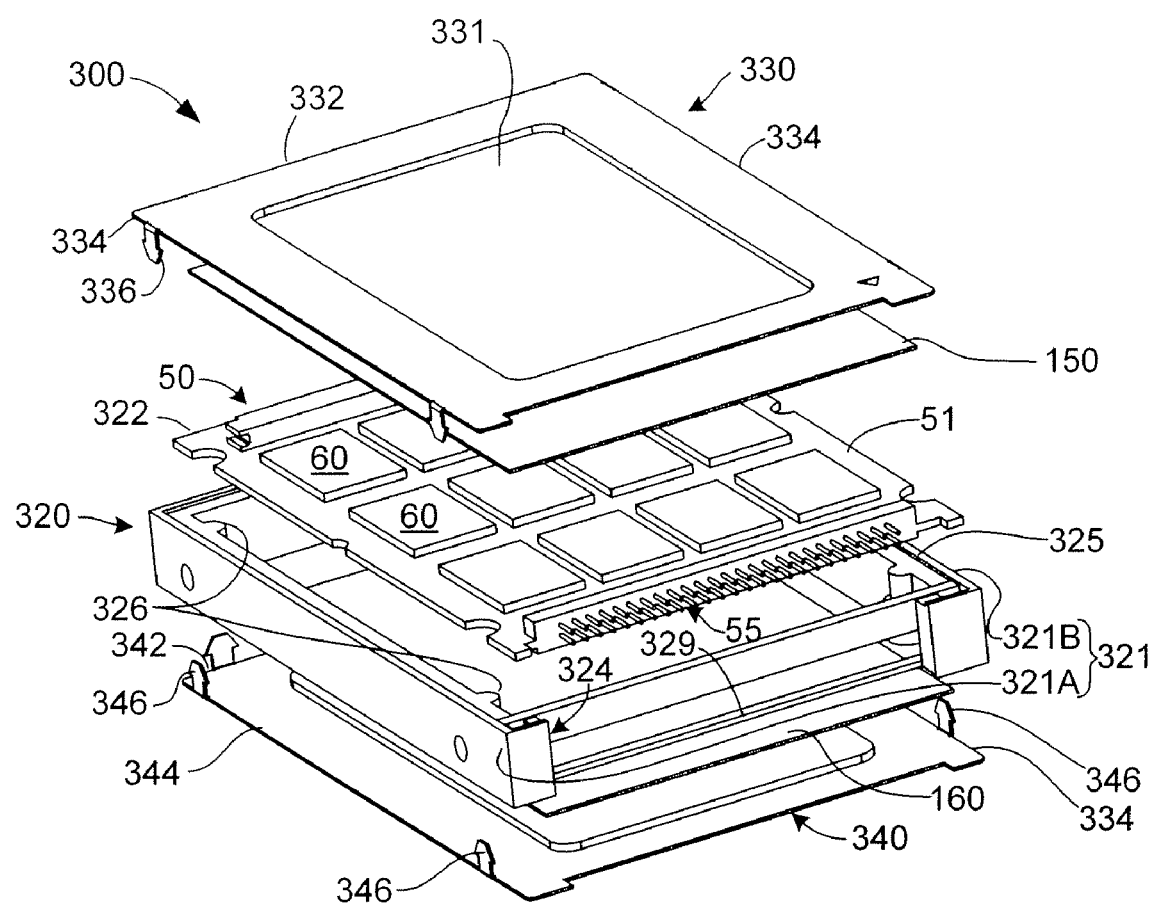
FIG. 13 is an exploded perspective view showing a flash hard drive frame according to another embodiment of the present invention.

FIG. 13 is an exploded perspective view showing a flash hard drive 300 including PCBA 50 (discussed above) and a housing including a plastic frame 320, a top metal panel 330, and a bottom metal panel 340. Flash hard drive 300 differs from the embodiments described above in that top cover 330 and bottom cover 340 include male-type connection structures 336 and 346 that respectively extend from side edges 334 and 344. Frame 320 is formed substantially as described above but includes engagement holes (not shown) that allow connection structures 336 and 346 to engage plastic frame 320. Engaging structures are optionally provided on closed back end walls 332 and 342 of top metal panel 330 and bottom metal panel 340, respectively. Contact layers 150 and 160 are respectively provided between inside surfaces of top metal panel 330 and bottom metal panel 340 and PCBA 50 (e.g., connecting to the upper surfaces of IC devices 60 and/or to portions of PCB 51). According to alternative specific embodiments of the present invention, contact layers 150/160 comprise a heat-activated adhesive (e.g., thermal bonding film product number TBF668, produced by 3M of St. Paul Minn., or hot melt film product number 7802, produced by Henkel Loctite Corp. (Industrial) of Rocky Hill Conn.), or comprise a heat-cured adhesive (e.g., Dow Corning product number 3-6752).

Figure 14:
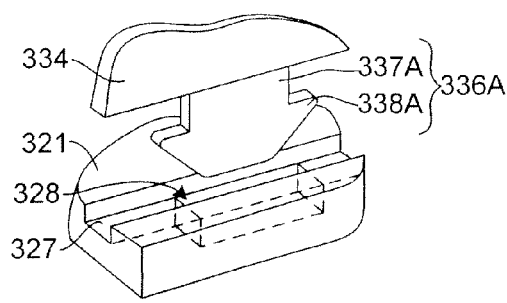
FIG. 14 is a partial exploded perspective view showing a male-type connection finger and a corresponding engagement hole according to an embodiment of the present invention.

FIG. 14 is a partial exploded perspective view showing a portion of top panel side edge 334 including male-type connection finger 336A, and a corresponding portion of frame side rail 321 including engagement hole 328 according to an embodiment of the present invention. As described above, connection finger 336A extends downward from a lower edge of side wall 334, and engagement hole 328 is formed in the bottom surface of groove 327. Connection finger 336A includes an elongated member 337A connected to the corresponding side/end edge (e.g., side edge 334), and one or more engagement members 338A extending from the sides of elongated member 337A.

Figure 15A:
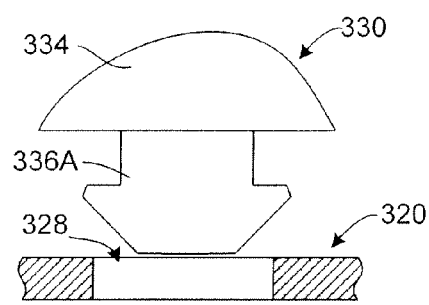
FIGS. 15(A), 15(B), and 15(C) are partial cross-sectional side views showing the connection finger of FIG. 14 during connection of a panel to the frame according to an embodiment of the present invention.
Figure 15B:
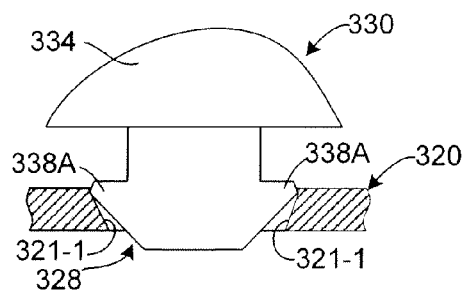
Figure 15C:
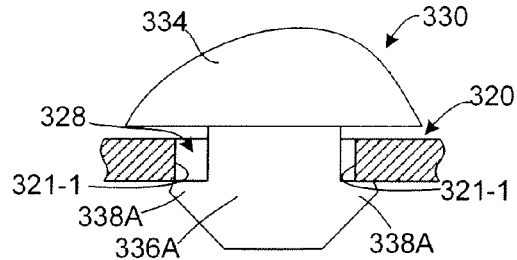

FIGS. 15(A) through 15(C) are simplified cross-sectional side views showing connection finger 336A during connection of top panel 330 (e.g.,.side edge 334) to the frame 320. As indicated in FIG. 15(A), top panel 330 positioned over frame 320 such that connection structure 336A is positioned over corresponding engagement hole 328. Next, as indicated in FIG. 15(B), as top panel 330 is pressed against frame 320, engagement member 338A contacts and deflects or otherwise deforms side edges 321-1 of engagement hole 328, thereby causing elongated member 337A to enter engagement hole 328 as indicated. Referring to FIG. 15(C), once engagement member 338A has cleared the lower end of engagement hole 328, side edges 321-1 resiliently return to their substantially original shape, thereby engaging engagement member 336A and securing top panel 330 to frame 320 in a permanent manner (i.e., such that removal of top panel 330 would necessarily permanently damage connection finger 336A and/or portion 321-1 of frame 320). Connection finger 336A and top panel 330 thus provide a sturdy structure for producing flash hard drives. Note that the description associated with connection finger 336A is substantially identical to that associated with the connection fingers formed on the bottom panel, which is omitted herein for brevity.

Figure 16:
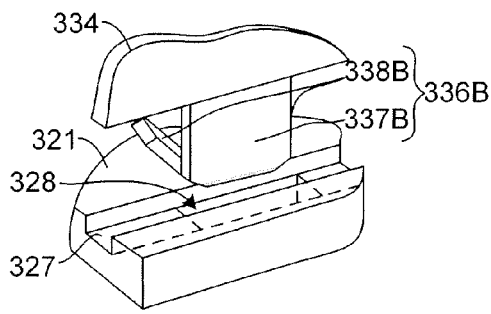
FIG. 16 is a partial exploded perspective view showing a male-type connection finger and a corresponding engagement hole according to another embodiment of the present invention.
Figure 17:
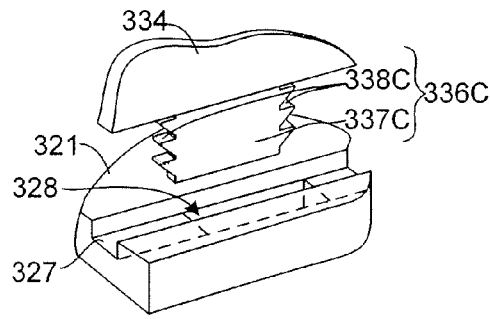
FIG. 17 is a partial exploded perspective view showing a male-type connection finger and a corresponding engagement hole according to yet another embodiment of the present invention.
Figure 18:
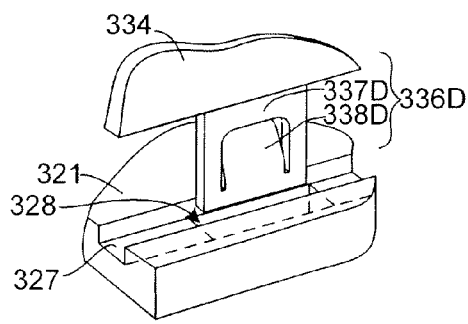
FIG. 18 is a partial exploded perspective view showing a male-type connection finger and a corresponding engagement hole according to yet another embodiment of the present invention.
Figure 19:
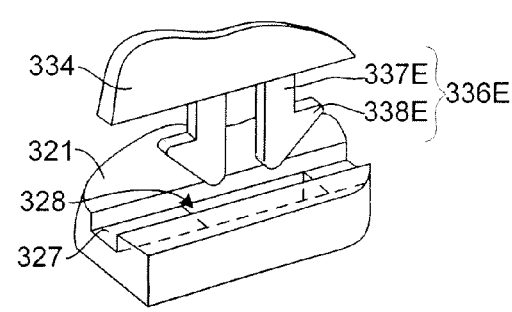
FIG. 19 is a partial exploded perspective view showing a male-type connection finger and a corresponding engagement hole according to yet another embodiment of the present invention.

FIGS. 16, 17, 18 and 19 show alternative male-type connection structures that can be utilized in place of connection finger 336A (FIG. 14). FIG. 16 shows a portion of top panel side edge 334 including male-type connection finger 336B, which includes an elongated member 337B connected to side edge 334, and an two-part engagement member 338B that is bent inward from elongated member 337B. FIG. 17 shows another male-type connection finger 336C, which includes an elongated member 337C connected to side edge 334, and a series of teeth-like engagement members 338C formed along an edge of elongated member 337C. FIG. 18 shows another male-type connection finger 336D including an elongated member 337D connected to side edge 334, and a central tab-like engagement members 338D extending inward from elongated member 337D. Finally, FIG. 19 shows another male-type connection finger 336E including a pair of elongated members 337E connected to side edge 334, each having an engagement member 338E extending along the longitudinal direction of side edge 334 from its respective elongated member 337E. The various male-type connection structures shown in FIGS. 14-19 are intended to be exemplary and not limiting. Further, those skilled in the art will recognize that other connection structures (e.g., female-type structures that receive male structures extending from frame 320) may also be used.

FIG. 20 is an exploded perspective view showing a flash hard drive 400 including a two PCBAs 50-1 and 50-2 mounted inside of a housing 310 that includes a plastic frame 320, an upper metal panel 330, and a lower metal panel 340, which are similar to corresponding structures described above with reference to flash hard drive 300. PCBAs 50-1 and 50-2 respectively include PCBs 51-1 and 51-2 that are mounted in a stacked arrangement inside of housing 310. In addition, to minimize vertical spacing, flash hard drive 400 utilizes peripheral adhesive strips 450 and 460, or adhesive layers to respectively secure the outer perimeter of upper metal panel 330 to upper PCBA 50-1, and the outer perimeter of lower metal panel 340 to lower PCBA 50-2.

FIGS. 21 and 22 are exploded perspective and assembled perspective drawings showing a 1.8" flash hard drive 500 according to another embodiment of the present invention. Similar to the structures described above, 1.8" flash hard drive 500 includes a PCBA 50-3 including a PCB 51-3 having an appropriately sized footprint, and is housed inside a plastic frame 520, upper metal panel 530 and bottom panel 540 in a manner similar to that described above. The flash hard drive structures described above are generally configured to be a replacement for existing IDE HDD devices for certain applications. The common choices for current IDE HDD are 3.5", 2.5", and 1.8". The electrical signals are the same for all three kinds of HDD. The 3.5" HDD uses a standard 40-pin 0.100" IDE connector and a separate 4-pin power connector. The 2.5" and 1.8" HDD uses a 44-pin 2mm IDE connector with pins 41-43 are used for power connection. For use in host system with 3.5" HDD environment, the 2.5" and 1.8" HDD need an adapter to change the standard 40-pin 0.100" IDE connector and power connector to 44-pin 2mm IDE connector.

The metal material used for the top and bottom cover plates mentioned above can be replaced by plastics, as there is fewer Electrical Magnetic Interference (EMI) issues with the flash memory devices than with the mechanical spinning hard disk drives.

The IC devices such as flash memory controller, flash memory chip, etc. mentioned above can be in the die form using the die bonding technique to attach them to the PCB. Due to the situation that there is a limit to the size of the PCB and the flash memory hard drive, the new technique allows the memory capacity of the flash memory hard drive to increase. In additional, the less packaging material used for the IC devices translate to reduced total weight of the flash memory hard drive.

Although the present invention has been described with respect to certain specific embodiments, it will be clear to those skilled in the art that the inventive features of the present invention are applicable to other embodiments as well, all of which are intended to fall within the scope of the present invention. For example, the 2D self-engaging connection structure arrangement associated with flash hard drive 300 may be replaced with other male-female type connecting structures that are known in the art. Further, the various embodiments described with reference to a longitudinal shelf may utilize the slot-based longitudinal platform described herein with reference to FIGS. 13 and 14. Accordingly, the appended claims are directed to all such flash hard drive-like structures, such as some solid state hard drives and compact flash cards.

The invention claimed is:
1. A flash hard drive comprising:
a printed circuit board assembly (PCBA) including a printed circuit board (PCB), a connector mounted on a front edge of the PCB, and a plurality of integrated circuit (IC) devices mounted onto one or more surfaces of the PCB;
a plastic frame including first and second parallel side rails and a back end rail extending between first ends of the first and second side rails; and
first and second panels mounted on the side rails and end rail of the plastic frame such that the first panel extends over the first surface of the PCB and the second panel extends over the second surface of the PCB,
wherein the plastic frame defines an open front end located at second ends of the first and second side rails,
wherein the first and second side rails include a longitudinal platform for receiving and supporting the PCBA such that the plug connector is exposed through the open front end of the plastic frame, and wherein the first and second panels comprise metal, and wherein the flash hard drive further comprises an adhesive layer secured to external surfaces of the IC devices and to an inside surface of at least one of the first and second metal panels.

2. The flash hard drive according to claim 1, wherein said one of said first and second panels includes a planar peripheral region surrounding the IC devices, and a planar indented section attached to the planar peripheral region, and wherein the contact layer contacts both an inside surface of the planar indented section and said external surface of the IC devices.

3. A flash hard drive comprising:
a printed circuit board assembly (PCBA) including a printed circuit board (PCB), a connector mounted on a front edge of the PCB, and a plurality of integrated circuit (IC) devices mounted onto one or more surfaces of the PCB;
a plastic frame including first and second parallel side rails and a back end rail extending between first ends of the first and second side rails; and
first and second panels mounted on the side rails and end rail of the plastic frame such that the first panel extends over the first surface of the PCB and the second panel extends over the second surface of the PCB,
wherein the plastic frame defines an open front end located at second ends of the first and second side rails,
wherein the plastic frame defines an elongated first groove including portions extending along the first and second side rails,
wherein the first panel includes a cover plate having side edges,
wherein the side edges are arranged to fit within the portions of the elongated first groove when the first panel is mounted onto the plastic frame such that an upper surface of the first panel is flush with upper edges of the side rails,
wherein the plastic frame further defines elongated second groove including portions extending along a lower surface of at least one of the first and second side rails,
wherein the second panel comprises a cover plate having side edges respectively extending along opposite sides of the cover plate, and
wherein the side edges are arranged to fit within the elongated second groove when the second panel is mounted onto the plastic frame such that an upper surface of the second panel is flush with lower edges of the side rails.

4. The flash hard drive according to claim 3, wherein an end portion of the elongated first groove extends along the end rail,
wherein the first panel further comprises a back end edge, and
wherein the back end edge is arranged to fit within the end portion of the first groove when the first panel is mounted onto the plastic frame.

5. The flash hard drive according to claim 3, wherein the plastic frame further comprises a plurality of engagement holes formed in the elongated first and second grooves,
wherein the first and second panels further comprise a plurality of connection fingers extending from each of the side walls, and
wherein the connection fingers are arranged such that each connection finger extends into a corresponding engagement hole of said plurality of engagement holes when the first and second panels are mounted onto the plastic frame.

6. The flash hard drive according to claim 5, wherein each connection finger comprises an elongated member having a first end connected to the associated side edge, and an engagement member extending from the resilient member, wherein the engagement member is disposed to fixedly engage a portion of the plastic frame when the first and second panels are mounted onto the plastic frame and said each connection finger is inserted into a corresponding engagement hole defined in the plastic frame.

7. The flash hard drive according to claim 5, wherein the first panel comprises a plurality of first self-locking connection structures and the second panel comprises a plurality of second self-locking connection structures, and wherein the engagement holes are positioned such that at least one of the first and second connection structures extends through a corresponding one of the engagement holes when the first and second panels are mounted onto the plastic frame, and wherein the first and second self-locking structures are constructed to self-engage when the first and second panels are mounted onto the plastic frame.

8. The flash hard drive according to claim 5, wherein the first panel comprises a plurality of male-type connection structures and the second panel comprises a plurality of female-type connection structures, and wherein the engagement holes are positioned such that each male-type connection structure extends through a corresponding one of the engagement holes and engages a corresponding one of the female-type engagement structure when the first and second panels are mounted onto the plastic frame.

9. The flash hard drive according to claim 3, wherein the longitudinal platform comprises first and second support shelves respectively formed on the first and second side rails for respectively receiving side edges of the PCB when the PCBA is fully inserted into the plastic frame.

10. The flash hard drive according to claim 9,
wherein each of the first and second side rails further comprises one or more alignment protrusions,
wherein the side edges of the PCB define alignment notches, and
wherein the PCBA is mounted on to the support shelves such that the alignment protrusions are received in the alignment notches.

11. The flash hard drive according to claim 10, wherein the back end rail defines an end shelf portion of the longitudinal platform for receiving and supporting a back edge of the PCB when the PCBA is fully inserted into the plastic frame.

12. The flash hard drive according to claim 3, wherein the longitudinal platform comprises first and second slot portions respectively formed on the first and second side rails for respectively receiving side edges of the PCB when the PCBA is slidably inserted into the plastic frame.

13. The flash hard drive according to claim 12, wherein the back end rail defines an end slot portion of the longitudinal platform for receiving and supporting an edge of the PCB when the PCBA is fully inserted into the plastic frame.

14. The flash hard drive according to claim 3, wherein the flash hard drive is substantially the same form factor as one of a 2.5" Integrated Drive Electronics (IDE) hard-disk drive (HDD) device, and a 1.8" Integrated Drive Electronics (IDE) hard-disk drive (HDD) device.

* * * * *